United States Patent [19]

Toews

[11] Patent Number: 4,796,664

[45] Date of Patent: Jan. 10, 1989

[54] TWO-AXIS FORCE MOTOR

[75] Inventor: Hans G. Toews, East Aurora, N.Y.

[73] Assignee: Moog Inc., East Aurora, N.Y.

[21] Appl. No.: 114,585

[22] PCT Filed: Mar. 25, 1987

[86] PCT No.: PCT/US87/00730

§ 371 Date: Oct. 20, 1987

§ 102(e) Date: Oct. 20, 1987

[87] PCT Pub. No.: WO87/06051

PCT Pub. Date: Oct. 8, 1987

[51] Int. Cl.[4] .................................... F16K 11/14
[52] U.S. Cl. ......................... 137/595; 137/596.17;
137/870; 251/129.2; 335/268
[58] Field of Search ............... 335/229, 268; 137/595,
137/596.17, 870; 251/129.2

[56] References Cited

U.S. PATENT DOCUMENTS 4,428,558  1/1984  Idogaki et al. ............... 335/229 X
4,546,338 10/1985  Idogaki et al. ............... 335/229 X
4,600,871  7/1986  Idogaki et al. ............... 335/229 X

FOREIGN PATENT DOCUMENTS 2104249  3/1983  United Kingdom ........... 137/625.65

*Primary Examiner*—Gerald A. Michalsky
*Attorney, Agent, or Firm*—Sommer & Sommer

[57] ABSTRACT

A two-axis force motor (10) has an armature (12) mounted within a body (11) for omni-directional pivotal movement relative to the body. The motor has an electrical section for causing the armature to pivot selectively in either or both of two mutually-perpendicular intersecting planes (x-x, y-y). The motor also has a fluidic section, which includes a plurality of valve members (64) spaced about the armature. These valve members are biased to engage the armature and are closed when the armature is in a null position. When the armature is pivoted off-null, some of the valve members will be opened, while others will remain closed.

13 Claims, 3 Drawing Sheets ial structure shown and described, but rather should be construed to cover any form or modification thereof within the scope of the invention as defined in the appended claims.

TWO-AXIS FORCE MOTOR

TECHNICAL FIELD

The present invention relates generally to the field of electro-mechanical force motors, and, more particularly, to an improved force motor for converting one or more electrical signals into omni-directional pivotal movement of an armature relative to a body.

BACKGROUND ART

A force motor is an electro-mechanical device for converting an electrical signal into a desired physical displacement of a member. Such a force motor, sometimes called a "torque motor" if a force acts at an arm distance from a pivot point, has been widely used in electrohydraulic servovalves. In such applications, the electrical signal may represent either a command signal or an error signal supplied to the servovalve. For example, such a motor may be used to displace an armature-flapper member between two opposing nozzles through which fluid is discharged (see, e.g., U.S. Pat. Nos. 2,767,689 and 3,023,782), or a jet pipe through which fluid is discharged toward a plurality of receiver openings (see, e.g., U.S. Pat. Nos. 3,542,051 and 3,612,103). In these earlier applications, however, it was only necessary to displace the member in one plane.

DISCLOSURE OF THE INVENTION

The present invention provides an improved force motor in which an armature is mounted for omni-directional pivotal movement relative to a body.

The improved motor broadly includes: a body; an armature mounted on the body for omni-directional pivotal movement relative thereto, this armature being elongated along an axis; a centering device acting between the body and armature for urging the armature to move to a null position, at which the armature axis will be coincident with a line defined by the intersection of two planes; at least one first coil mounted on the body and selectively energizable to cause the armature to pivot in one of the planes; and at least one second coil mounted on the body and selectively energizable to cause the armature to pivot in the other of the planes; whereby these coils may be selectively energized, either individually or in combination with one another, to cause the armature to selectively pivot off-null in a desired direction and for a desired distance.

Accordingly, the general object of the invention is to provide an improved force motor.

Another object is to provide an improved force motor in which an armature may be pivoted omni-directionally relative to a body.

Another object is to provide an improved force motor in which an armature may be pivoted omni-directionally by a magnitude proportional to the supplied current.

Still another object is to provide an improved two-axis force motor having a pivoted armature movable off-null in any desired angular direction to selectively control the operation of a plurality of actuators sensitive to the position of the armature.

These and other objects and advantages will become apparent from the foregoing and ongoing written specification, the drawings, and the appended claims.

MODE(S) OF PRACTICING THE INVENTION

Figure 4:
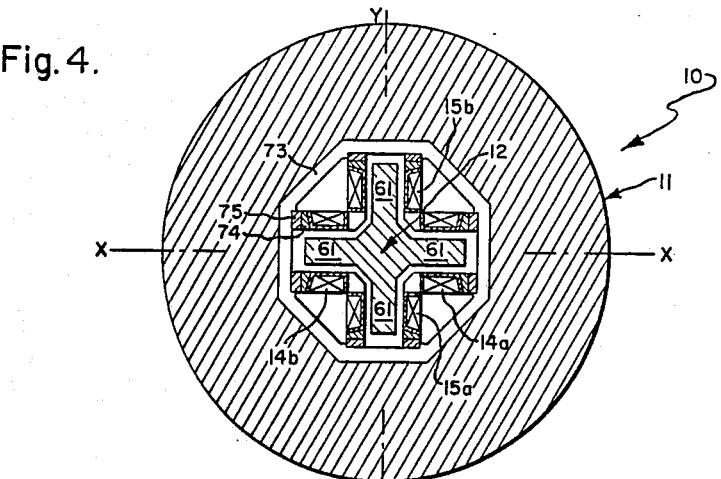
FIG. 4 is a horizontal sectional view, taken generally on line 4—4 of FIG. 1, showing the arms of the armature as being encircled by the coils.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, etc.) together with the specification, and are to be considered a portion of the entire "written description" of this invention, as required by 35 U.S.C. § 112. As used in the following description, the terms "horizontal", "vertical", "left", "right", "up" and "down", as well as adjectival and adverbial derivatives thereof (e.g., "horizontally", "rightwardly", "upwardly", etc.), refer to the orientation of the illustrated structure as the particular drawing figure faces the reader. Similarly, the terms "inwardly" and "outwardly" refer to the orientation of a surface of revolution relative to its axis, unless otherwise indicated. As used herein, the term "fluid" encompasses both a liquid and a gas.

This invention broadly provides an electro-mechanical force motor in which an armature is mounted somewhat as a joy-stick for omni-directional pivotal movement relative to a body in either or both of two intersecting planes. These two planes are preferably perpendicular to one another. Two embodiments of the improved force motor are disclosed herein. The first embodiment is shown in FIGS. 1-5, and the second is shown in FIGS. 6-10. However, it should be clearly understood that these two embodiments are only species examples of what the generic claims are intended to cover. Hence, the appended claims should not be limited to either specific embodiment, or to the illustrated application of such motor, unless an express limitation to that effect appears therein. These two preferred embodiments will be described seriatim herebelow.

First Embodiment (FIGS. 1-5)

Referring now to FIGS. 1-5, the first embodiment of the improved two-axis force motor is generally indicated at 10. Motor 10 broadly includes a body 11 having a recess or cavity, an armature 12 arranged within this recess for omni-directional pivotal movement relative to the body, a centering device 13 (FIG. 1), at least one first coil 14A (FIG. 4) which may be selectively energized to cause the member to pivot in one vertical plane, and at least one second coil 15A (FIG. 4) which may be selectively energized to cause the member to pivot in another vertical plane.

Figure 2:
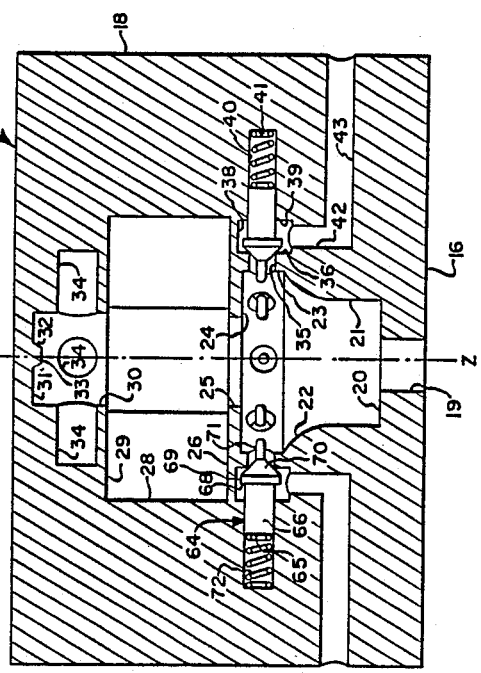
FIG. 2 is an enlarged view of the body shown in FIG. 1.

As best shown in FIG. 2, body 11 is a solid cylinder generated about a vertical axis z—z. The body has a horizontal circular upper face, an annular horizontal lower face 16, and an outwardly-facing vertical cylindrical side surface 18. A specially-configured axial recess extends upwardly into the body from its lower face. This recess sequentially includes (from bottom to top in FIG. 2): an inwardly-facing vertical cylindrical surface 19, an upwardly-facing annular horizontal surface 20, an inwardly-facing vertical cylindrical surface 21, a convex annular surface 22 continuing upwardly and outwardly therefrom, an inwardly-facing vertical cylindrical surface 23, a downwardly-facing annular horizontal surface 24, an inwardly-facing vertical cylindrical surface 25, an upwardly-facing annular horizontal surface 26, an inwardly-facing vertical octagonal surface 28 rising upwardly therefrom, a downwardly-facing annular horizontal surface 29, an inwardly-facing vertical cylindrical surface 30, a downwardly-facing annular horizontal surface 31, a downwardly- and outwardly-facing frusto-conical surface 32, and a downwardly-facing circular horizontal surface 33. Surfaces 32,33 form a depending stub to position the upper end of a spring, as described infra.

Four circularly-spaced horizontal holes, severally indicated at 34, extend radially into the body from recess surface 30, to accommodate centering springs, as described infra. These four holes are equally spaced from one another by 90° intervals. Hence, while only three of these holes are seen in FIG. 2, it will be understood that there is an additional hole (not shown).

Body 11 is further shown as provided with eight circularly-spaced radial passageways, each of which communicates recess surface 23 with body outer surface 18. These several passageways are spaced equally from one another by 45° intervals. With respect to body axis z—z, each passageway is defined by a horizontal hole 35 extending radially outwardly from recess surface 23, an outwardly-facing annular vertical surface 36, a horizontal cylindrical surface 38 extending radially outwardly therefrom, an inwardly-facing annular vertical surface 39, and a blind horizontal hole 40 continuing radially outwardly therefrom and terminating in an inwardly-facing vertical circular surface 41. A vertical hole 42 extends downwardly from its intersection with surface 38 and communicates with a horizontal hole 43, which extends radially outwardly therefrom to open onto body side surface 18. The intersection of surfaces 35,36 forms an outwardly-facing annular vertical edge or seat. While the body has been shown schematically as being integrally formed, persons skilled in this art will readily appreciate that the body may be formed of various sections joined together to form a sub-assembly.

Figure 1:
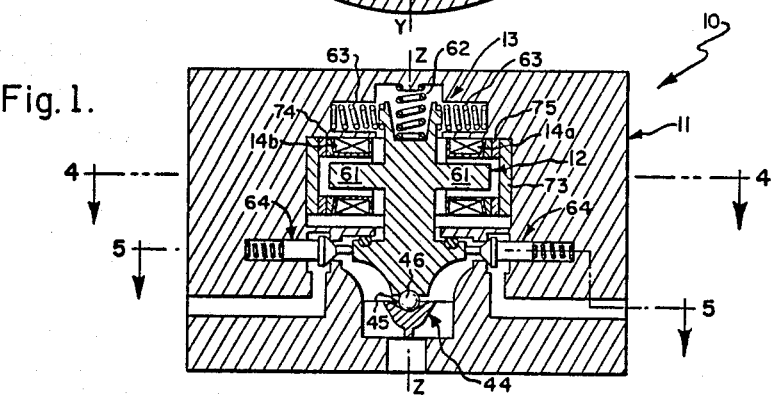
FIG. 1 is a fragmentary schematic vertical sectional view of a first preferred form of the two-axis force motor.

Referring now to FIG. 1, a cruciform member 44 is arranged in the body recess. This member is somewhat X-shaped when viewed in top plan (not shown), and has four legs radiating outwardly in horizontal directions toward recess surface 21 from a central hub. The lower surfaces of these legs rest on body surface 20. An upwardly-facing concave recess or depression 45 extends downwardly and axially into the hub from the upper surface thereof to accommodate a spherical ball 46, on which the armature is pivotally mounted. Thus, the center of ball 46 is coincident with recess vertical axis z—z. At the same time, the spaces between the legs of member 44 allow fluid to flow upwardly from the inlet hole 19 and into the plurality of passageways.

Figure 3:
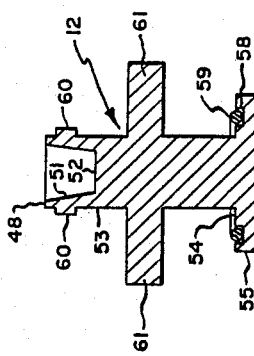
FIG. 3 is an enlarged view of the armature shown in FIG. 1.

As best shown in FIG. 3, the armature 12 is a vertically-elongated member having annular horizontal upper and lower faces 48,49, respectively. A spherical recess 50 extends axially upwardly into the armature from its lower face to receive the upper portion of ball 46. Recess 50 may be of substantially the same radius as ball 46. Another axial recess extends downwardly into the armature from its upper face. This recess is bounded by an inwardly- and upwardly-facing frusto-conical surface 51 which extends downwardly from upper face 48, and an upwardly-facing horizontal circular bottom surface 52. Member 12 has an outer surface which sequentially includes (from top to bottom in FIG. 3): an outwardly-facing vertical cylindrical surface 53 extending downwardly from upper face 48, an upwardly-facing annular horizontal surface 54, an outwardly-facing vertical cylindrical surface 55, and a concave annular surface 56 continuing downwardly and inwardly therefrom to join lower face 49. An annular groove 58 extends downwardly into this member from surface 54 to receive and accommodate an O-Ring 59, which is sealingly compressed against body recess surface 24, as shown in FIG. 1. Four cylindrical nubs, severally indicated at 60, extend radially outwardly from an upper portion member surface 53, at four circumferential locations spaced 90° apart. Similarly, four horizontal arms, severally indicated at 61, extend radially outwardly from an intermediate portion of member surface 53. Each of these arms has a rectangular transverse cross-section (not shown), and is elongated along a horizontal axis which lies in the same plane as the axis of elongation of the particular nub thereabove. Thus, four of nubs 60 and four of arms 61 are spaced equally about member 12, with each arm being located beneath an associated nub.

Adverting to FIG. 1, the armature 12 is arranged within the body recess, such that armature recess 50 embraces ball 46. A first vertical coil spring 62 acts between the body and member, and continuously urges the member to move downwardly into engagement with ball 46. The upper marginal end portion of spring 62 surrounds the depending body stub, while the lower marginal end of this spring engages the bottom surface 52 of the armature upper recess.

In this form, the centering device 13 includes four horizontal centering springs, severally indicated at 63, which act continuously between the body and armature, and which bias or urge the armature to move to the centered or null position shown in FIG. 1, at which position the axis of the armature will be coincident with body axis z—z. These four centering springs are arranged in the four body holes 34, such that their outward ends bear against hole end surfaces 41 and their inward ends encircle nubs 60 and bear against armature surface 53.

Figure 5:
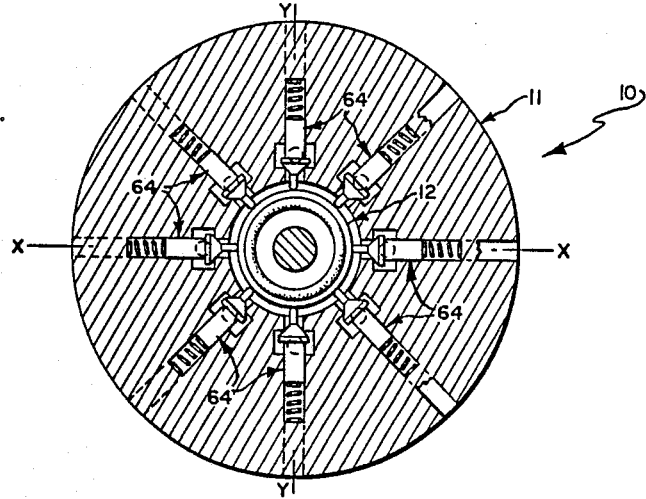
FIG. 5 is a horizontal sectional view, taken generally on line 5—5 of FIG. 1, showing the valve members engaging the armature, and showing the armature in its null position.

A valve member, generally indicated at 64, is arranged in each passageway for selective movement toward and away from the associated seat formed by the intersection of body surfaces 35,36. With respect to body axis z—z, each valve member has a circular vertical outer end face 65, a horizontal cylindrical surface 66 extending radially inwardly therefrom and slidably engaging body surface 40, an outwardly-facing annular vertical surface 68, a horizontal cylindrical surface 69 continuing radially inwardly therefrom, an inwardly-facing frusto-conical surface 70, and an axial projection 71 continuing radially inwardly therefrom and terminating in an inwardmost rounded nose. A spring 72 is arranged in each end chamber to bias the associated valve member to move inwardly. The outer ends of these springs engage body surfaces 41, and the inner ends thereof bear against valve member outer end faces 65. When the armature is in its centered or null position, as shown in FIGS. 1 and 5, the noses of the inwardly-biased valve members will severally engage armature surface 55, and the various frusto-conical surfaces 70 will sealingly engage their associated seats to prevent flow from inlet opening 19 to outlet openings 43. However, if the armature is pivoted off-null in any lateral direction, those valve members toward which the armature is moved will be selectively displaced off their seats to permit flow through the associated passageways. At the same time, the noses of those valve members from which the armature is moved away will separate from armature surface 55. However, the frusto-conical surfaces 70 of such unaffected valve members will continue to engage their seats, and the associated passageways will remain closed. Thus, armature 12 may be pivoted off-null in any lateral direction to selectively open some of the passageways. Those passageways which are opened, and those which remain closed, depend upon the direction of such pivotal movement. Of course, the magnitude of such valve member displacement will be greatest in those passageway(s) toward which member 12 is directly moved, and progressively less in the neighboring passageways. In the disclosed embodiment, only those passageways in the 90° quadrant toward which the armature is moved will be affected, while all of the other passageways will remain closed.

Referring now to FIGS. 1 and 4, the electrical section is shown as including a flux-conductive polygonal ring 73, and four coils. These coils are arranged in two cooperative pairs, indicated at 14A,14B and 15A,15B. Ring 73 is arranged in the body recess to abut polygonal surface 28, and is formed of a ferrous material. Two of the armature arms extend leftwardly and rightwardly along the x—x axis. The other two arms extend upwardly and downwardly along the y—y axis. The x—x, y—y and z—z axes intersect at a point, and are mutually perpendicular. Each arm is encircled by a coil. Each coil is spaced from the ring by a polepiece 74 and a permanent magnet 75. Coil 14A encircles the rightwardly-extending arm, while coil 14B encircles the leftwardly-extending arm. Coils 14A,14B are electrically connected in series, but are reversely wound. Hence, if a current of one polarity is provided to coils 14A,14B, the encircled left and right arms will be shifted in one direction along axis x—x. If a current of the opposite polarity is supplied to coils 14A,14B, such arms will be shifted in the opposite direction along axis x—x. Coil 15A encircles the downwardly-extending arm, while coil 15B encircles the upwardly-extending arm. These two coils are also reversely wound and connected in series. Hence, if a current of one polarity is applied to coils 15A,15B, the upper and lower arms will be displaced in one direction along axis y—y. Conversely, if the polarity of this current is reversed, such arms will be shifted downwardly along axis y—y.

Thus, the upper portion of armature 12 may be selectively displaced, or have components of displacement, along the x—x and/or y—y axes by merely varying the polarity and magnitude of the current(s) supplied to the respective coil pair(s). For example, in the illustrated embodiment, omni-directional pivotal movement of the armature about ball 46, is used to selectively control the positions of eight valve members relative to their associated seats. When seen in horizontal section (FIG. 5), these valve members are circumferentially-spaced about the armature by equal intervals of 45°. Thus, for example, to move the armature upwardly toward the 12:00 o'clock position, coils 15A,15B would be energized with a current of the appropriate polarity. Alternatively, if it were desired to move the armature downwardly toward the 6:00 o'clock position, coils 15A,15B would be energized with a current of the opposite polarity. On the other hand, to move the armature rightwardly toward the 3:00 o'clock position, an appropriate current of one polarity would be applied to coils 14A,14B. Conversely, if it were desired to move the armature leftwardly toward the 9:00 o'clock position, the polarity of the current provided to coils 14A,14B would be reversed. Thus, the armature may be moved along either axis by merely energizing the appropriate coil pair which produces armature movement along that axis. Pivotal movement in any plane including the vertical z—z axis may also be obtained by causing the armature to have appropriate displacement components along the x—x and y—y axes. The following table is illustrative of one possible coil energization matrix for the first embodiment to displace the armature in the indicated direction (+ = positive current, — = negative current, 0 = coil deenergized):

TABLE I

| Toward Actuator Position | Polarity of Energized Coils | | | |
|---|---|---|---|---|
| | Coil 14A | Coil 14B | Coil 15A | Coil 15B |
| 12:00 | 0 | 0 | + | + |
| 1:30 | + | + | + | + |
| 3:00 | + | + | 0 | 0 |
| 4:30 | + | + | — | — |
| 6:00 | 0 | 0 | — | — |
| 7:30 | — | — | — | — |
| 9:00 | — | — | 0 | 0 |
| 10:30 | — | — | + | + |

Therefore, coils 14A,14B may be appropriately energized to selectively pivot the armature in the vertical plane including the x—x and z—z axes, while coils 15A,15B may be appropriately energized to selectively pivot the armature in the vertical plane including the y—y and z—z axes. By varying the polarity and magnitude of the applied coil current(s), the armature may have displacement components in both axes. By having compound displacement, the armature may be selectively pivoted in any plane which includes the z—z axis. Thus, the armature somewhat resembles a joy-stick in that it is mounted for omni-directional pivotal movement.

While the coils of each cooperative pair may be reversely wound and connected in series, as described above, this arrangement need not be invariably obtained. The coils may be energized individually, if desired. While the reversely-wound coils are preferred because of their inherent push-pull capability, only one coil need be provided to displace the armature in each axis. Alternatively, the coils may be energized individually, as opposed to the cooperative pair arrangement heretofore described. Moreover, while the plane including the x—x and z—z axes is perpendicular to the plane including the y—y and z—z axes, such planes need not necessarily be mutually perpendicular. The form or shape of the armature may be readily varied, as may the specific form and use of the actuator(s) responsive to such pivotal movement of the armature.

Accordingly, this first embodiment broadly provides a two-axis force motor (i.e., 10) which includes: a body (i.e., 11) having a recess therein; an armature (i.e., 12) arranged in this body recess for omni-directional pivotal movement relative to the body; a centering device (i.e., 13) acting between the body and armature for urging the armature to move to a null position at which the axis of the armature will be coincident with a line (i.e., the z—z axis) defined by the intersection of two planes (i.e., the plane including the x—x and z—z axes, and the plane including the y—y and z—z axes); a first coil (i.e., 14A or 14B) mounted on the body and selectively energizable to cause the armature to pivot in one of the planes; and a second coil (i.e., 15A or 15B) mounted on the body and selectively energizable to cause the armature to pivot in the other of the planes.

Second Embodiment (FIGS. 6-10)

A second embodiment of the improved two-axis force motor is generally indicated at 76 in FIGS. 6-10. This form broadly includes a body 78, an armature 79 arranged within the body for omni-directional pivotal movement in either or both of two vertical planes including vertical axis z—z, a centering device 80, a first coil 81A which may be selectively energized to pivot the armature in the plane including the x—x and z—z axes, and a second coil 82A which may be selectively energized to displace the armature in the plane including the y—y and z—z axes.

Figure 7:
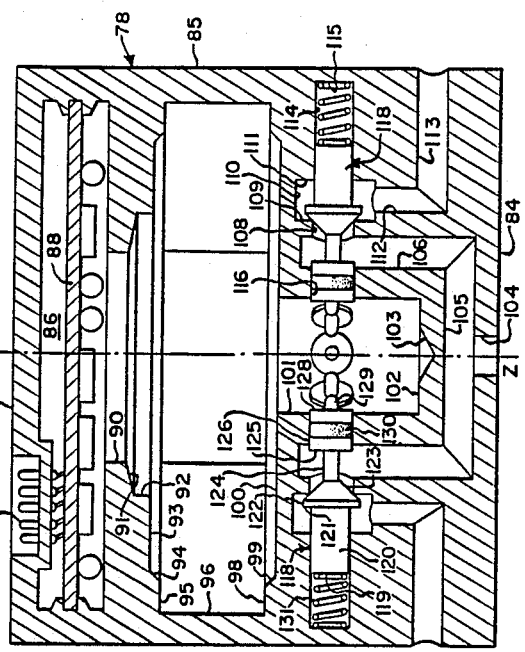
FIG. 7 is an enlarged view of the body shown in FIG. 6.

Referring now to FIG. 7, body 78 is shown as being a cylindrical member generated about vertical axis z—z. The body has a horizontal circular upper face 83, an annular horizontal lower face 84, and an outwardly-facing cylindrical side surface 85 extending vertically therebetween. The body has an internal cavity which includes an upper portion 86, in which a printed circuit board 88 is mounted. Electrical communication with this circuit board is provided through a pin connector 89. From this cavity upper portion 86, an axial recess extends downwardly into the body. This recess is bounded by (from top to bottom in FIG. 7): an inwardly-facing vertical cylindrical surface 90 extending downwardly from cavity upper portion 86, a downwardly- and inwardly-facing frusto-conical surface 91, an inwardly-facing vertical cylindrical surface 92, a downwardly-facing annular horizontal surface 93, a downwardly- and inwardly-facing frusto-conical surface 94, a downwardly-facing annular horizontal surface 95, an inwardly-facing octagonal surface 96 extending downwardly therefrom, an upwardly-facing annular horizontal surface 98, an upwardly- and inwardly-facing frusto-conical surface 99, an upwardly-facing annular horizontal surface 100, an inwardly-facing cylindrical surface 101 extending downwardly therefrom, an upwardly-facing annular horizontal bottom surface 102, and a conical recess surface 103.

In this form, eight radial passageways communicate a common fluid inlet with eight circumferentially-spaced openings about body side surface 85. The inlet is represented by an axial hole 104 drilled upwardly into the body from lower face 84. With respect to body axis z—z, each passageway is shown as including a horizontal hole 105 and extending radially outwardly from hole 104, an upwardly-extending vertical blind hole 106, a horizontal hole 108 extending radially outwardly from an upper portion of hole 106, an outwardly-facing annular vertical surface 109, a horizontal cylindrical surface 110 continuing radially outwardly therefrom, an inwardly-facing annular vertical surface 111, a vertical hole 112 extending downwardly from surface 110, and a horizontal hole 113 extending radially outwardly from the lower margin of hole 112 and communicating with body side surface 85. A horizontal blind hole 114 extends radially outwardly from surface 111 and terminates in an inwardly-facing vertical circular surface 115. Another radial hole 116 communicates body recess surface 101 with hole 106. The horizontal holes 116,108,114 of each passageway are radially aligned.

A valve member generally indicated at 118 is mounted in each of the eight passageways for radial inward and outward movement. With respect to body axis z—z, each valve member has a circular vertical outer end face 119, a horizontal cylindrical surface 120 extending inwardly therefrom and slidably mounted in hole 114, an outwardly-facing annular vertical surface 121, a horizontal cylindrical surface 122 extending radially inwardly therefrom, an inwardly-facing frustoconical surface 123 arranged to selectively engage an outwardly-facing annular vertical seat formed by the intersection of hole 108 and surface 109, a horizontal cylindrical surface 124 continuing radially inwardly therefrom, an outwardly-facing annular vertical surface 125, a horizontal cylindrical surface 126 continuing radially inwardly, an inwardly-facing annular vertical surface 128, and a projection 129 continuing inwardly therefrom and terminating in an inwardmost rounded nose. An annular groove (not shown) extends into the valve member from its surface 126 to receive and accommodate an O-Ring 130, which sealingly and slidably engages body surface 116. Hence, the electrical section of the force motor is isolated from the fluidic section thereof. A spring 131 is compressed in each valve member end chamber, such that its outer end will engage body surface 115 and its inner end will engage valve member outer end face 119. These springs 131 continuously bias their associated valve members to move radially inwardly until frustoconical surfaces 123 sealingly engage their seats. When the armature is in its null or centered position, as shown in FIG. 6, at which its axis of elongation will be coincident with body axis z—z, each passageway will be closed and the nose of each valve member will engage the armature.

Figure 8:
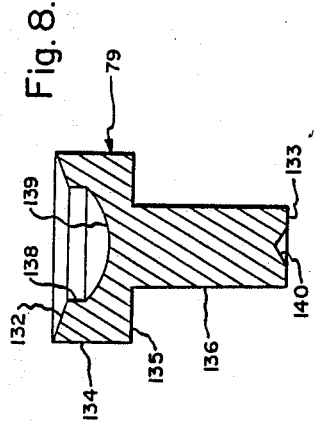
FIG. 8 is an enlarged view of the armature shown in FIG. 6.

As best shown in FIG. 8, armature 79 is a vertically-elongated ferrous member having an upwardly- and inwardly-facing frusto-conical upper face 132, and having an annular horizontal lower face 133. The outer surface of this armature includes an outwardly-facing vertical cylindrical surface 134 extending downwardly from upper face 132, a downwardly-facing annular horizontal surface 135, and an outwardly-facing vertical cylindrical surface 136 continuing downwardly therefrom to join lower face 133. A recess extends downwardly into the armature from its upper face. This upper recess is bounded by an inwardly-facing vertical cylindrical surface 138, which depends from the inner margin of frusto-conical surface 132, and an upwardly-facing concave surface 139. Surface 139 is preferably spherical, with its bottom dead center coincident with the vertical axis of the armature. Another recess, bounded by conical surface 140 extends axially upwardly into the body from its lower face 133.

Figure 6:
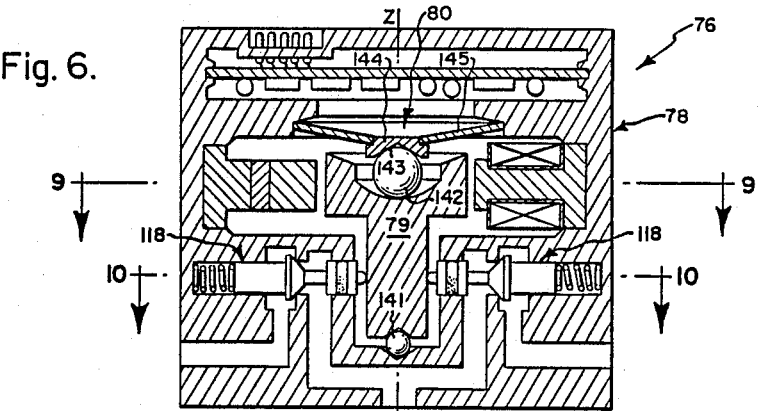
FIG. 6 is a fragmentary schematic vertical sectional view of a second preferred form of the improved two-axis force motor, this view being taken generally on line 6—6 of FIG. 9.
Figure 10:
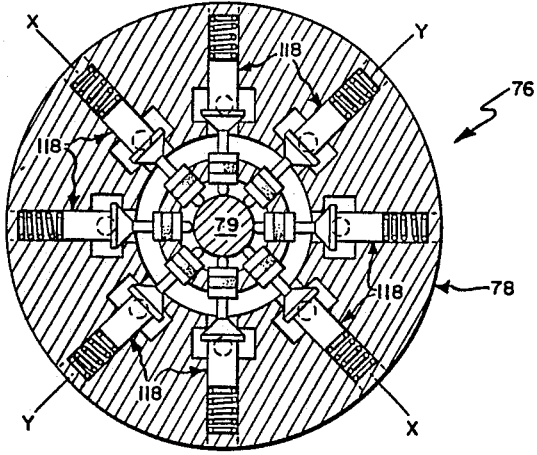
FIG. 10 is a horizontal sectional view, taken generally on line 10—10 of FIG. 6, showing the valve members engaging the armature, and showing the armature in its null position.

Adverting now to FIG. 6, the armature is arranged in the body recess such that a spherical ball 141 will be captured between body recess 103 and armature recess 140. Hence, the armature is mounted for omni-directional pivotal movement relative to the body about any vertical plane which passes through the center of ball 140 and body axis z—z.

Another spherical ball 142 is arranged in the armature upper recess and engages spherical surface 139. This ball is received in the downwardly-facing conical recess 143 of a ball retainer 144. A Belleville spring 145 has its outer margin engaging body surfaces 91,92, has its inner margin engaging an annular corner recess of the ball retainer, and continuously biases the ball to move downwardly along body axis z—z. Because armature concave surface 139 has a larger radius than ball 142, the ball is continuously urged to move to the bottom dead center of surface 139. The effect of this is to continuously urge the armature to move to a null position, at which its axis will be coincident with body axis z—z. However, the armature may be selectively pivoted off-null about ball 141 in any angular direction, as described infra. Such pivotal movement of the armature is accommodated by flexure of Belleville spring 145. However, when the disturbing load is removed, spring 145 will return the armature to its null position, as shown in FIG. 6. Thus, ball 142, ball retainer 144 and spring 145 comprise the centering device 80 of this second embodiment.

When armature 79 is in its null position, springs 131 bias their associated valve members 118 to move radially inwardly toward body axis z—z such that their rounded noses will engage armature surface 136. At the same time, the frusto-conical surface 123 of each valve member will sealingly engage its seat to prevent flow through the associated passageway. Hence, if the armature is thereafter pivoted off-null, the valve member(s) toward which the armature is moved, will be moved radially outwardly. This will cause the affected valve members to move off their seats, and selectively open the associated passageways. The degree of individual valve opening will be related to the proximity of such valves to the direction of armature movement. At the same time, those valve members which are perpendicular to the plane of movement, and those valve members from which the armature is moved away, will be unaffected by such pivotal movement, and will continue to sealingly engage their associated seats. In the disclosed embodiment, there are a total of eight valve members. These are spaced equally from one another by incremental angles of 45°. Hence, if the armature is pivoted rightwardly toward the 3:00 o'clock position shown in FIG. 10, the valve member at that position will experience the greatest magnitude of displacement. The valve members in the 1:30 o'clock and 4:30 o'clock positions will also be displaced, but to a lesser degree. However, the remaining valve members will continue to sealingly engage their seats. In this manner, directed pivotal movement of the armature may be used to selectively control the opening of certain valves. Of course, while the preferred embodiment is shown as including eight valve members, a greater or lesser number might alternatively be employed, depending upon the particular application. It should also be understood that the invention is not limited to controlling the operation of such valve members, for these are only one species example of a generic class of actuators which may be operatively displaced by the improved motor.

Figure 9:
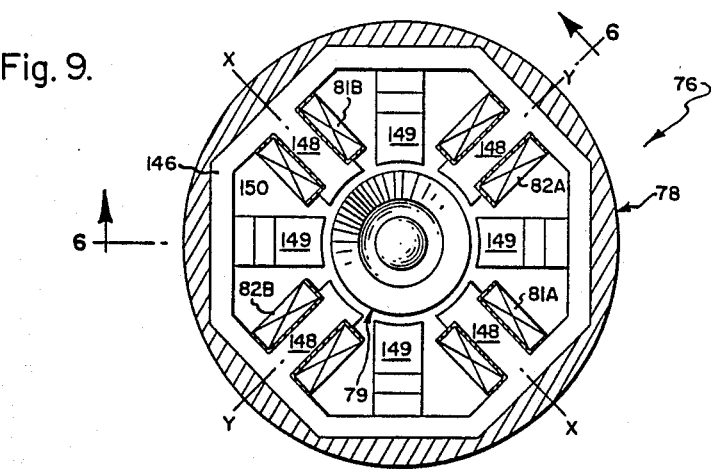
FIG. 9 is a horizontal sectional view, taken generally on line 9—9 of FIG. 6, showing the armature in its null position between the polepieces.

Referring now to FIG. 9, the electrical section is shown as including an octagonal ferrous ring 146 arranged to face body surface 96. Eight polepieces extend horizontally inwardly from the midpoints of the sides of this ring so as to radially approach the z—z axis. These eight polepieces are arranged in an alternating series of first and second polepieces 148,149, respectively. The inwardmost vertical surface of each polepiece is shown as being in the form of a cylindrical segment generated about body axis z—z, and the areas of these surfaces are the same. Hence, the cross-sectional area of the air gap between each polepiece and the armature is the same. However, the length of each air gap, this being the radial distance between armature surface 134 and the cylindrical inner surface of each polepiece, may vary in response to the pivotal position of the armature. When the armature is in its null position, as shown in FIG. 9, the lengths of all eight air gaps are the same.

The four first polepieces 148 are shown as being arranged in the 1:30, 4:30, 7:30 and 10:30 o'clock positions, while the four second polepieces 149 are arranged in the 3:00, 6:00, 9:00 and 12:00 o'clock positions. Each of the first polepieces 148 is surrounded by a coil, and these coils are arranged in diametrically-opposite cooperative pairs. The coils of a particular pair are preferably reversely-wound, but electrically connected in series, as in the first embodiment. Thus, coils 81A,81B, which surround the polepieces in the 4:30 and 10:30 o'clock positions, respectively, form one cooperative pair, and coils 82A,82B, which surround the polepieces in the 1:30 and 7:30 o'clock positions, respectively, form another cooperative pair. Each of the second polepieces 149 is shown as including a permanent magnet 150, which creates a static flux in the air gaps. However, the coil pairs may be selectively energized, either individually or in combination with one another, to selectively pivot the armature in any desired direction relative to the body. The following table is illustrative of one possible coil energization matrix to displace the armature in the indicated direction (+ =positive current, − =negative current, 0=coil denergized):

TABLE II

| Toward Actuator Position | Polarity of Energized Coils | | | |
| --- | --- | --- | --- | --- |
| | Coil 81A | Coil 81B | Coil 82A | Coil 82B |
| 12:00 | + | + | + | + |
| 1:30 | 0 | 0 | + | + |
| 3:00 | − | − | + | + |
| 4:30 | − | − | 0 | 0 |
| 6:00 | − | − | − | − |
| 7:30 | 0 | 0 | − | − |
| 9:00 | + | + | − | − |
| 10:30 | + | + | 0 | 0 |

Of course, the direction and magnitude of such pivotal displacement, depends on the polarity and magnitude of the applied coil current(s). The various coil pairs need not be energized with current(s) of the same magnitude.

While applicant presently prefers to electrically connect the reversely-wound coils of each cooperative pair in series with one another, so as to simplify the coil energization matrix and to utilize the push-pull feature of such arrangement, this need not be invariably provided. Indeed, the member, arrangement and energization scheme for the various coils, may be readily varied or modified, as desired. The number and spacing of the actuators, such as valve members 118, may be readily changed or modified, as desired.

Therefore, this second embodiment provides a two-axis force motor which comprises: a body (i.e., 78) having a recess; an elongated armature (i.e., 79) mounted in the body recess for omni-directional pivotal movement relative to the body; a centering device (i.e., 80) acting between the body and armature for urging the armature to move to a null position at which the axis of the armature will be coincident with a line (i.e., the z—z axis) defined by the intersection of two planes (i.e., the plane including the x—x and z—z axes, and the plane including the y—y and z—z axes); a first coil (i.e., 81A or 81B) mounted on the body and selectively energizable to cause the armature to pivot in one of the planes; and a second coil (i.e., 82A or 82B) mounted on the body and selectively energizable to cause the armature to pivot in the other of the planes.

It should also be understood that while the armature may be mounted as a joy-stick for omni-directional pivotal movement in either or both of two intersecting planes, movement of the armature in a third dimension (e.g., along axis z—z) is not excluded from the scope of the invention. For example, the pivot ball 46 of the first embodiment, or the pivot ball 141 of the second embodiment, might be mounted for movement along axis z—z. The means for effecting such vertical movement of the armature might be either electrical, mechanical, fluidic, or a combination of these. The surface of the armature which is engaged by the actuator noses might therefore be configured as a cam, depending on the particular application. Indeed, the actuators need not invariably contact the armature, as proximity sensors might be used to sense the position of the armature. If desired, the joy-stick member may be mounted so as to pivot about a flexure point.

Accordingly, while two presently preferred embodiments of the improved two-axis force motor have been shown and described, and several modifications thereof discussed, persons skilled in this art will readily appreciate that various additional changes and modifications may be made without departing from the spirit of the invention, as defined and differentiated by the following claims.

I claim:
1. A two-axis force motor, comprising:
a body;
an armature mounted on said body for omni-directional pivotal movement relative thereto, said armature having an axis of elongation;
a centering device for urging said armature to move toward a null position relative to said body at which said armature axis will be coincident with a line defined by the intersection of two planes;
a first coil mounted on said body and selectively energizable to cause said armature to pivot off-null in one of said planes;
a second coil mounted on said body and selectively energizable to cause said armature to pivot off-null in the other of said planes; and
at least two actuators movably mounted on said body and engaging said armature, said actuators being arranged such that pivotal movement of said armature in any plane will cause at least one of said actuators to be displaced, each of said actuators being arranged to operated a valve.

2. A two-axis force motor as set forth in claim 1 wherein said first coil is arranged to cause said armature to pivot in one polar direction of said one plane, and further comprising a third coil mounted on said body and selectively energizable to cause said armature to pivot in the opposite polar direction of said one plane.

3. A two-axis force motor as set forth in claim 1 wherein said second coil is arranged to cause said armature to pivot in one polar direction of said other plane, and further comprising a fourth coil mounted on said body and selectively energizable to cause said armature to pivot in the opposite polar direction of said other plane.

4. A two-axis force motor as set forth in claim 1 wherein said intersecting planes are perpendicular to one another.

5. A two-axis force motor as set forth in claim 1 wherein said centering device includes a plurality of springs operatively arranged to bias said armature to said null position.

6. A two-axis force motor as set forth in claim 1 wherein said centering device includes a concave recess provided in said armature, and a convex element biased to the bottom of said recess.

7. A two-axis force motor as set forth in claim 1 wherein each of said valves is closed when said armature is in said null position.

8. A two-axis force motor as set forth in claim 7 wherein each of said actuators is biased to move toward said armature.

9. A two-axis force motor as set forth in claim 1 wherein said armature has at least one arm extending outwardly along a centerline in one of said planes, and wherein one of said coils encircles said arm.

10. A two-axis force motor as set forth in claim 1 wherein said body includes a plurality of polepieces, and wherein each polepiece has a surface arranged in spaced facing relation to said armature when said armature is in said null position.

11. A two-axis force motor as set forth in claim 10 wherein the air gap defined between said armature and each polepiece surface is substantially of the same length when said member is in said null position.

12. A two-axis force motor as set forth in claim 11 wherein the cross-sectional area of each air gap is substantially the same.

13. A two-axis force motor as set forth in claim 1 wherein said armature is formed integrally of a ferrous material.

* * * * *